United States Patent
Honda et al.

(10) Patent No.: US 8,628,133 B2
(45) Date of Patent: Jan. 14, 2014

(54) PACKAGE TRAY ASSEMBLY FOR TRUNK OF VEHICLE

(75) Inventors: Satoshi Honda, Nagoya (JP); Koji Toida, Miyoshi (JP); Jorge Fialho, Brussels (BE); Hiromi Takase, Kariya (JP); Koji Inoue, Kariya (JP)

(73) Assignees: Toyota Boshoku Kabushiki Kaisha, Kariya-Shi (JP); Toyota Jidosha Kabushiki Kaisha, Toyota-Shi (JP); Kabushiki Kaisha Toyota Jidoshokki, Kariya-Shi (JP); Kabushiki Kaisha Takehiro, Anjo-Shi (JP)

( * ) Notice: Subject to any disclaimer, the term of this patent is extended or adjusted under 35 U.S.C. 154(b) by 0 days.

(21) Appl. No.: 13/297,637

(22) Filed: Nov. 16, 2011

(65) Prior Publication Data

US 2012/0133171 A1   May 31, 2012

(30) Foreign Application Priority Data

Nov. 30, 2010   (JP) .................................. 2010-267433

(51) Int. Cl.
*B60N 3/00*   (2006.01)

(52) U.S. Cl.
USPC ..................................... 296/24.44; 296/24.43

(58) Field of Classification Search
USPC ............... 296/24.44, 24.43, 24.45, 37.16, 55, 296/37.8; 108/6
See application file for complete search history.

(56) References Cited

U.S. PATENT DOCUMENTS

| | | | | |
|---|---|---|---|---|
| 4,479,675 A | * | 10/1984 | Zankl | 296/37.16 |
| 4,648,648 A | * | 3/1987 | Shigesada et al. | 296/37.16 |
| 5,970,884 A | * | 10/1999 | Taille et al. | 108/44 |
| 6,394,002 B1 | * | 5/2002 | Blanchard et al. | 108/44 |
| 7,566,082 B2 | * | 7/2009 | Hofmann | 296/37.16 |
| 2010/0127526 A1 | * | 5/2010 | Decorme et al. | 296/37.16 |

FOREIGN PATENT DOCUMENTS

| | | | |
|---|---|---|---|
| EP | 1452393 A1 | * | 9/2004 |
| JP | 2010-125894 | | 6/2010 |
| JP | 2010-149671 | | 7/2010 |
| JP | 2010149671 A | * | 7/2010 |

* cited by examiner

*Primary Examiner* — Jason S Morrow
*Assistant Examiner* — E Turner Hicks
(74) *Attorney, Agent, or Firm* — Greenblum & Bernstein, P.L.C.

(57) ABSTRACT

A package tray assembly for a trunk of a vehicle includes a package tray and a support for supporting the package tray. The support is to be mounted to a body of the vehicle. The support includes a guide portion having a convex top surface. The package tray is to be attached to the support so as to be rotatable round a point located immediately below the guide portion as a center of rotation. The package tray includes a front end portion supported by the support when attached thereto. The front end portion includes a contact portion configured to move back and forth on the convex top surface while tilting at different angles relative to a moving direction.

11 Claims, 9 Drawing Sheets

PACKAGE TRAY ASSEMBLY FOR TRUNK OF VEHICLE

CROSS REFERENCE TO RELATED APPLICATION

This application claims priority from Japanese Patent Application No. 2010-267433 filed Nov. 30, 2010. The entire content of this priority application is incorporated herein by reference.

FIELD OF THE INVENTION

The present disclosure relates to a package tray assembly for a trunk of a vehicle.

BACKGROUND OF THE INVENTION

A package tray assembly for a trunk of a vehicle in published patent application JP-A-2010-149671 is known. A shaft for supporting a package tray is mounted to a vehicle body. The package tray includes a bearing for the shaft. The package tray is supported so as to be rotatable around the shaft. The package tray is arranged in the rear of the vehicle behind the back of a seat. The package tray covers a space between the back of the seat and a back door, or a trunk, such that baggage in the trunk can be hidden. Furthermore, the package tray can be moved up and down with the shaft as an axis of rotation along with open and close of the backdoor. Therefore, baggage can be easily put in or take out of the trunk.

When the baggage set in the trunk is higher than a horizontal position of the package tray, a rear part of the package tray is lifted by the baggage and the package tray is tilted with respect to the shaft. Namely, the package tray does not return to the proper horizontal position. If the backdoor is closed while the package tray is in an improper position, the package tray is pushed forward by the inner wall of the backdoor (or a rear window). Moreover, if a large pushing force is applied to the package tray and the package tray exceeds its elastic limit, the package tray may be broken.

SUMMARY OF THE INVENTION

The present invention has been made in view of the aforementioned circumstances. An objective of the present invention is to provide a package tray assembly, a package tray of which is less likely to receive an excessive load.

A technology described herein relates to a package tray assembly for a trunk of a vehicle. The package tray assembly includes a support and a package tray. The support is to be mounted to a body of the vehicle. The support includes a guide portion having a convex top surface. The package tray is to be attached to the support so as to be rotatable round a point located immediately below the guide portion of the support as the center of rotation. The package tray includes a front end portion supported by the support when attached thereto. The front end portion includes a contact portion configured to move back and forth on the convex top surface while tilting at different angles relative to a moving direction.

The package tray rotates around the point located immediately below the guide portion as the center of rotation without being supported thereat. When the package tray is moved from a horizontal position to a forward tilted position, it rotates with the contact portion thereof moving forward on a convex top surface. The package tray moves toward the lower front of the vehicle as it rotates. Therefore, even when the backdoor is closed while the rear of the package tray is lifted and the package tray does not return to the proper position, the package tray is less likely to be pressed against the backdoor. Namely, the package tray is less likely to receive an excessive load when the backdoor is closed.

DETAILED DESCRIPTION OF THE PREFERRED EMBODIMENTS

First Embodiment

Figure 1:
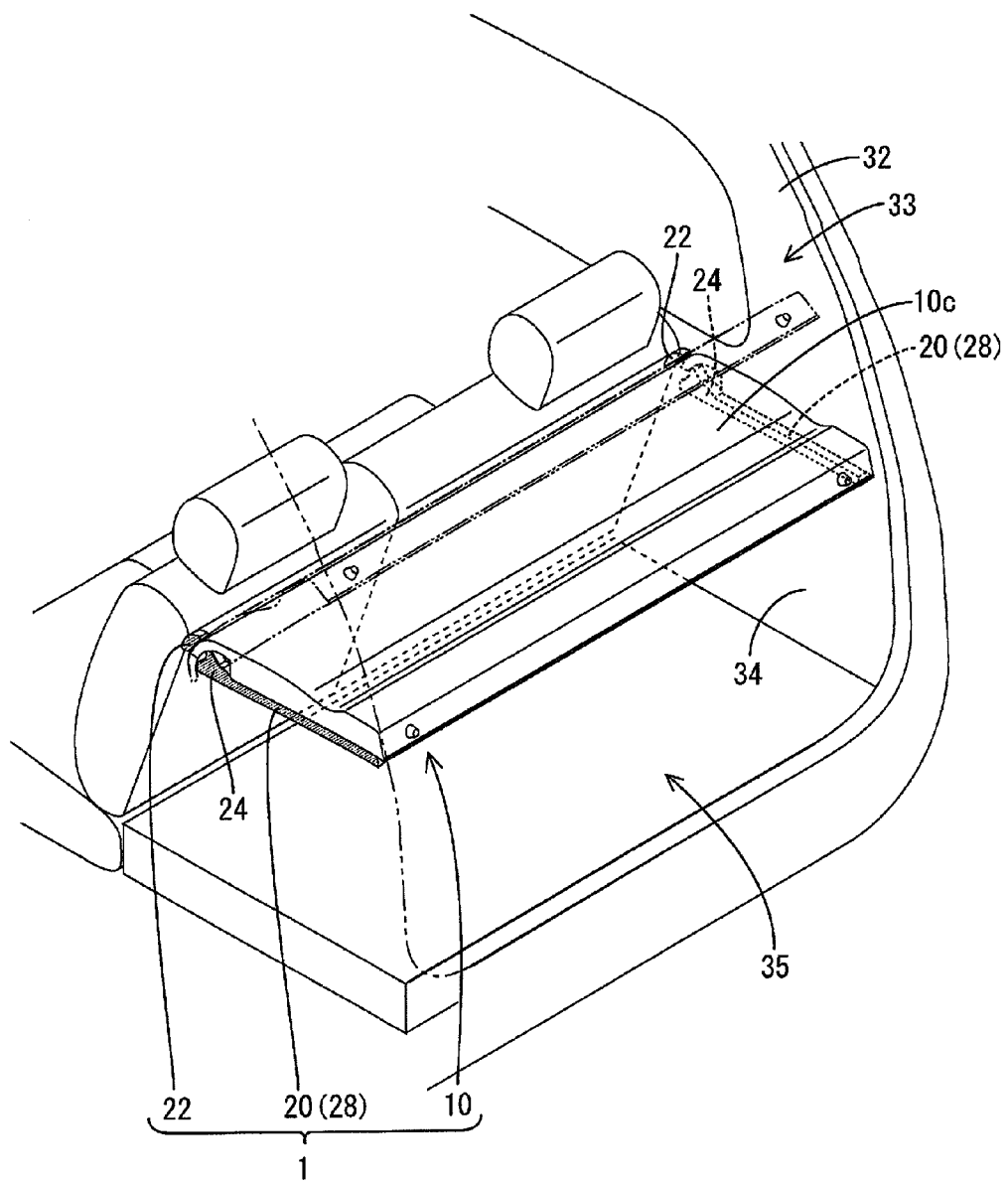
FIG. 1 is a simplified perspective view of a trunk with a package tray assembly in a rear part of a vehicle.

The first embodiment will be explained with reference to the drawings. A package tray assembly 1 illustrated in FIG. 1 includes a package tray 10, supports 20, and lift stoppers 22. The supports 20 and the lift stoppers 22 may be also referred to as first hinges and second hinges, respectively. As illustrated in FIG. 1, the package tray 10 is arranged over a trunk 35 in a rear part of a vehicle. A rear opening is provided at the rear of the trunk 35. A backdoor 38 is mounted to the vehicle body so as to cover the rear opening 33 (see FIG. 7). The backdoor 38 can be open or closed by lifting it up or pulling it down. The package tray 10 covers a space between the back of a rear seat 30 and the backdoor 38 to hide baggage in the trunk 35. In the following descriptions, the front and the rear correspond to the front part of the vehicle and the rear part of the vehicle, respectively. Furthermore, forward and backward means toward the front of the vehicle and toward the rear of the vehicle, respectively. A width direction corresponds to a direction parallel to the width of the vehicle.

The package tray 10 has a shallow box-like shape with an opening on the trunk 35 side. The package tray 10 is rotatable with the front part thereof as a supporting point between the horizontal position and the tilted position. The horizontal position and the tilted position are indicated by solid lines and dash-double-dotted lines in FIG. 1, respectively. The rear edge part of the package tray 10 can be lifted up or pulled down. The package tray 10 is connected to the backdoor 38 with attachments (not illustrated). When the backdoor 38 is opened, the package tray 10 moves from the horizontal position to the tilted position. When the backdoor 38 is closed, the back tray 10 moves from the tilted position to the horizontal position.

The trunk 35 has sidewalls 34 at the respective sides thereof. The supports 20 and the lift stoppers 22 are mounted to the sidewalls 34. A pair of the support 20 and the lift stopper 22 is mounted to each sidewall 34. The supports 20 are arranged so as to project inward in the trunk 35 and to face the each other. Each support 20 has a shelf portion 28 and a guide portion 24. The shelf portions 28 are arranged at upper parts of the respective sidewalls 34 so as to extend in the horizontal direction along the respective sidewalls 34. The guide portions 24 continue from the respective shelf portions 28. As illustrated in FIG. 1, the side edge portions of the package tray 10 are placed on the upper surfaces of the respective shelf portions 28 and supported by the supports 20 when the package tray 10 is set in the horizontal position. Each lift stopper 22 is located between a projecting portion 10a of the package tray 10 (see FIG. 2) and the rear seat 30. The lift stoppers 22 project inward inside the trunk 35 so as to face each other. The supports 20, the lift stoppers 22, and the sidewalls 34 are made of synthetic resin such as polypropylene. The shelf portions 28 are arranged below respective rear pillars 32 of the vehicle.

Figure 2:
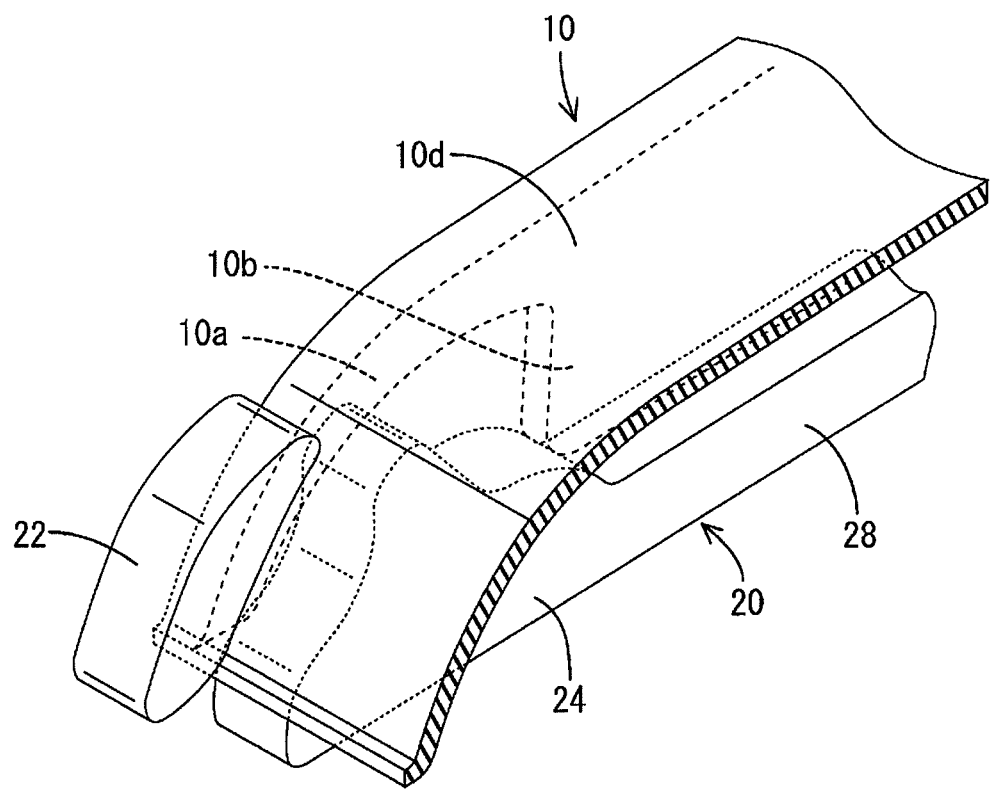
FIG. 2 is a perspective view of a part of a front-end portion of the package tray assembly.
Figure 3:
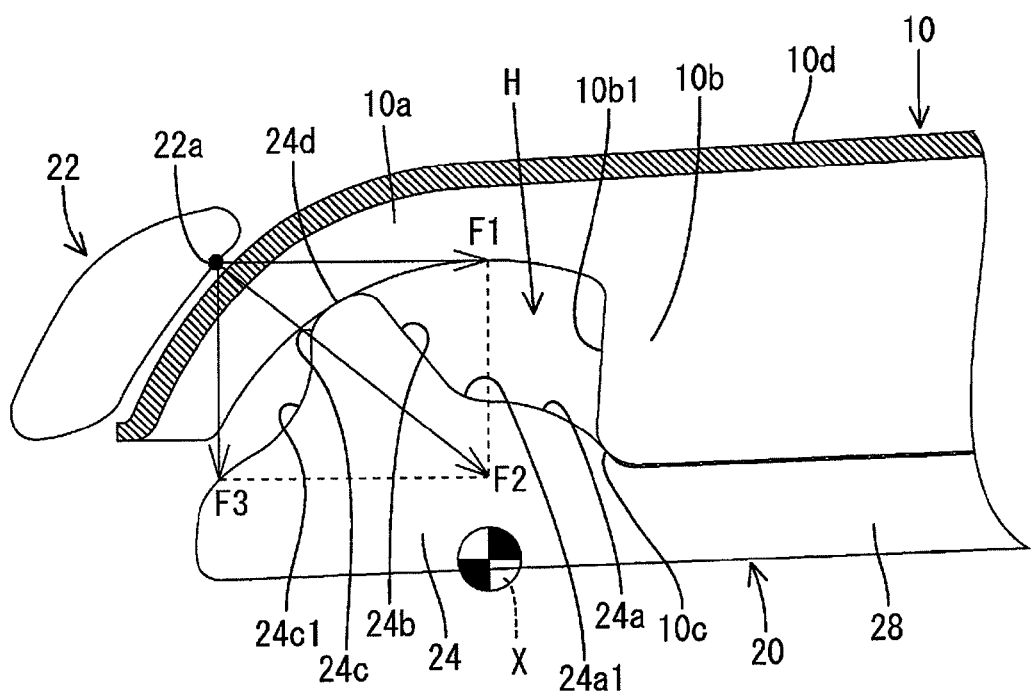
FIG. 3 is a side view of the part of the front-end portion of the package tray assembly with a package tray included in the package tray assembly set in the horizontal position.

As illustrated in FIG. 2, each projecting portion 10a projects forward from an upper part of the corresponding front end portion 10b so as to curve downward and form an arc when viewed from the side (see FIG. 3). The projecting portion 10a is inserted between the corresponding guide portion 24 and the corresponding lift stopper 22. The tip of the projecting portion 10a and the lower end of the lift stopper 22 are located at about the same height. The projecting portion 10a continues from the top surface 10d of the package tray 10. The projecting portion 10a is movable along the rotating direction of the package tray 10 while remaining between the guide portion 24 and the lift stopper 22.

Next, configurations of the supports 20, the lift stoppers 22, the front end portions of the package tray 10 will be explained in detail.

Figure 4:
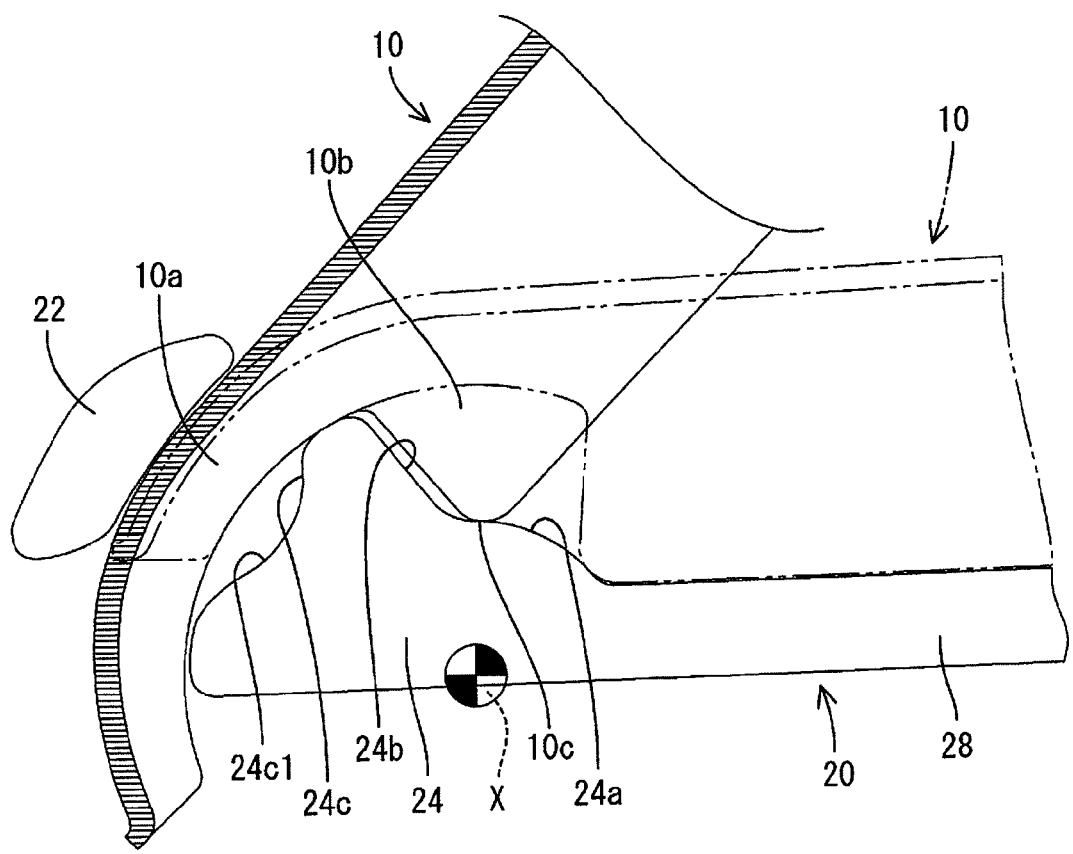
FIG. 4 is a side view of the part of the front-end portion of the package tray assembly with a package tray included in the package tray assembly set in a forward tilted position.

The guide portion 24 of each support 20 is formed such that the tip surface thereof project from farther than the top surface of the shelf portion 28. As illustrated in FIG. 3, the guide portion 24 of each support 20 has a convex top surface 24a, an inclined surface 24b, and a declined curved surface 24c. The convex top surface 24a and the declined curved surface 24c may be also referred to as a first curved surface and a second curved surface, respectively. As illustrated in FIGS. 3 and 4, the convex top surface 24a continues from the shelf portion 28 and curves outward. The inclined surface 24b rises from the front end of the convex top surface 24a toward the front. The inclined surface 24b is a sloped surface tilted toward the front. The declined curved surface 24c declines from the upper end of the inclined surface 24b toward the front. A side view of the declined curved surface 24c is a wavy curve. The declined curved surface 24c has a recess 24c1 around a halfway thereof.

Each lift stopper 22 is arranged above and more to the front than the declined curved surface 24c. The lift stopper 22 is arranged away from the guide portion 24. As illustrated in FIG. 3, the lift stopper 22 has an oval side-view shape with the long axis thereof extends between the upper rear end thereof and the lower front end thereof. A part of the lift stopper 22 faces the declined curved surface 24c. The lower end of the lift stopper 22 is located at about the same height as the guide surface 24a of the support 20. The upper end of the lift stopper 22 is located higher than the upper end of the declined curved surface 24c but lower than the top surface of the package tray 10.

As illustrated in FIG. 3, each front end portion 10b of the package tray 10 has a contact portion 10c. The contact portion 10c is in contact with the rear end of the convex top surface 24a when the package tray 10 is in the horizontal position. The contact portion 10c has a contact surface that is in contact with the convex top surface 24a. The contact surface is a curved surface and therefore it can tilt toward the front or the rear while being in contact with the convex top surface 24a. Furthermore, a space H is provided between the front edge of the front end portion 10b and the declined curved surface 24b. Therefore, the contact portion 10c is also movable toward the front or the rear along the guide surface 24a.

As illustrated in FIG. 3, a part of the upper surface of the projecting portion 10a is in contact with a part of the lift stopper 22 at a contact point 22a. Moreover, a part of the lower surface of the projecting portion 10a is in contact with the declined curved surface 24c at the upper end 24d. When the package tray 10 is set in the horizontal position, the parts of the upper surface and the lower surface of the projecting portion 10a are in contact with the lift stopper 22 and the declined curved surface 24c, respectively. Namely, the projecting portion 10a is sandwiched between the declined curved surface 24c and the lift stopper 22 and held with a force applied thereto in the thickness direction thereof. With this configuration, a movement of the projecting portion 10a toward the declined curved surface 24c or the lift stopper 22 is restricted. At the contact point 22a, the lift stopper 22 applies a force F1 for pressing the package tray 10 backward and a force F3 for pressing the package tray 10 downward. As a result, the package tray 10 is pressed toward the lower rear by a combined force F2 between the force F1 and the force F3.

Next, the rotation of the package tray 10 will be explained with reference to FIG. 5. When the rear part of the package tray 10 in the horizontal position as illustrated with chain double-dashed lines is lifted, the contact portion 10c moves forward on the convex top surface 24a as indicated by arrow A. When the contact portion 10c moves on the convex top surface 24a, it tilts toward the front. The package tray 10 is pushed toward the lower rear by the lift stopper 22. Namely, the lift stopper 22 restricts the contact portion from lifting and thus the contact portion 10c remains in contact with the convex top surface 24a when it moves on the convex top surface 24a.

As the contact portion 10c moves forward, the top surface of the projecting portion 10a moves along a first circle C1 drawn around a point X that is a center of rotation of the package tray 10. The bottom surface of the projecting portion 10a moves along a second circle C2 as indicated by arrow B. The second circle C2 is a circle drawn around the point X as its center. The package tray 10 rotates around the center X. The center X is an imaginary point that is located immediately below the convex top surface 24a, more specifically, under the front end of the convex top surface 24a and near the lower surface 20a of the support 20. "Immediately below the guide portion 24" herein corresponds to an area under the guide portion 24 and between the front end and the rear end of the convex top surface 24a.

Figure 5:
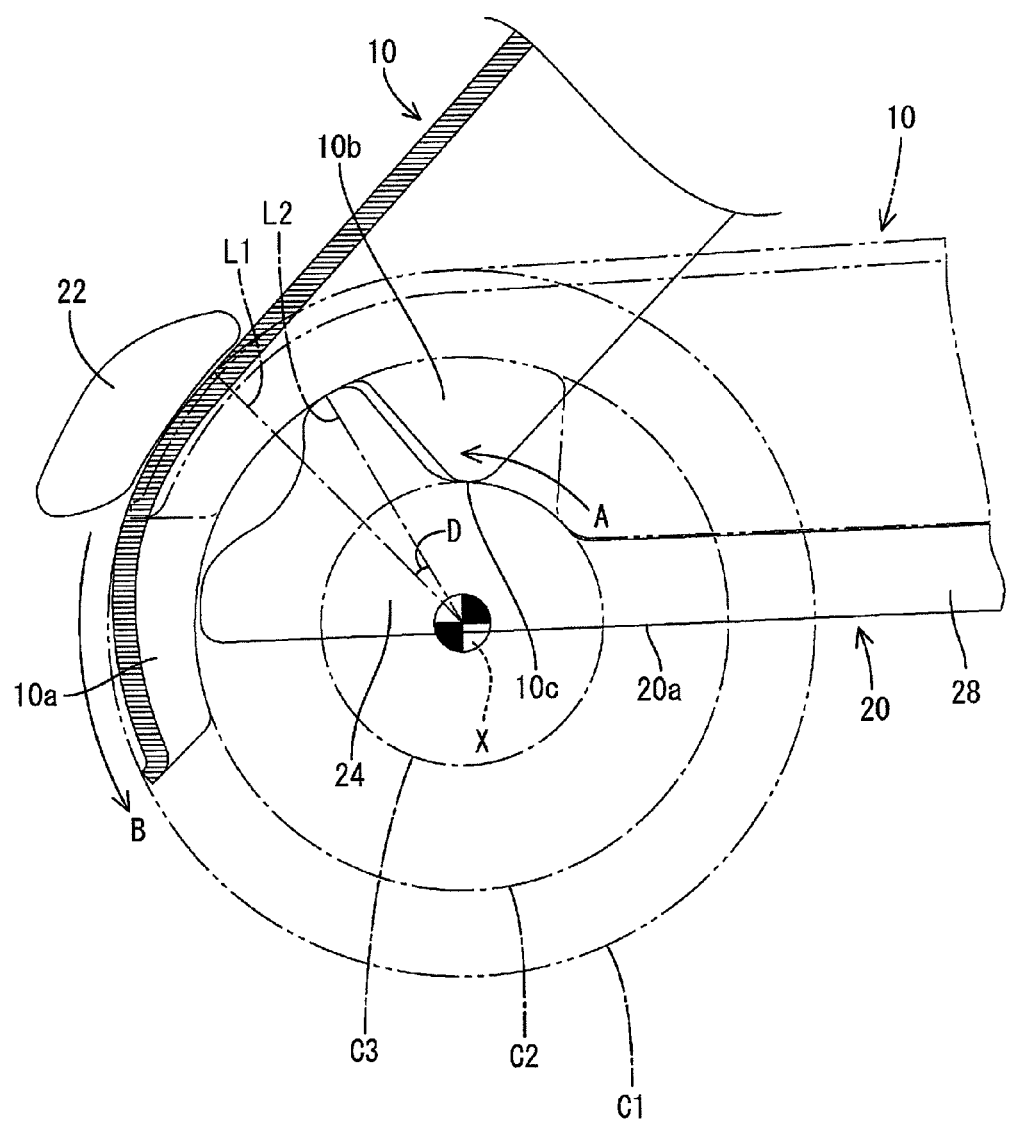
FIG. 5 is a side view of the front-end portion of the package tray assembly illustrating how the package tray rotates.

When the contact portion 10c moves forward on the convex top surface 24a and reaches the front end of the convex top surface 24a (indicated by the solid lines in FIG. 5), the package tray 10 is a forward tilted position (a position indicated by the solid lines in FIG. 5). A farther forward movement of the contact portion 10c is restricted by the inclined surface 10b. Therefore, the package tray 10 does not tilt forward any farther. The projecting portion 10a of the package tray 10 moves to a position lower than the lower surface 20a of the support 20 (indicated by arrow B) when the package tray 10 is rotated and set in the forward tilted position.

As described above, the contact portion 10c moves forward on the convex top surface 24a. When the package tray 10 is rotated from the horizontal position to the forward tilted position, the package tray 10 moves forward. Furthermore, the contact portion 10c tilts forward when it moves and thus the tip of the projecting portion 10a moves substantially under the lower surface 20a of the support 20. As the package tray 10 rotates from the horizontal position to the forward tilted position, it also moves downward. Namely, when the package tray 10 rotates from the horizontal position to the front tilted position, it also moves toward the lower front.

When the rear part of the package tray 10 in the forward tilted position is pulled down, the package tray 10 rotates from the front tilted position to the horizontal position. While the package tray 10 rotates from the front tilted position to the horizontal position, the contact portion 10c moves backward on the curved surface 24a. During this movement, the contact portion 10c tilts backward. As the contact portion 10c moves backward, the upper surface and the lower surface of the projecting portion 10a moves along the first circle C1 and the second circle C2 around the center X, respectively.

The contact portion 10c moves back and forth on the convex top surface while tilting at different angles relative to the moving direction thereof along with the rotation of the package tray 10.

The lift stopper 22 is located slightly closer to a cabin of the vehicle than the support 20 (see FIG. 1). The lift stopper 22 functions as a stopper when the package tray 10 rotates from the horizontal position to the forward tilted position. If the lift stopper 22 does not properly function as a stopper for properly holding the projecting portion 10a between the lift stopper 22 and the declined curved surface 24c, the projecting portion 10a may be lifted, and comes out of the space between the support 20 and the lift stopper 22, that is, the package tray 10 comes off. The lift stopper 22 is configured such that a contact area between the lift stopper 22 and the upper surface of the package tray 10 is larger than a contact area between the declined curved surface 24c and the lower surface of the projecting portion 10a. With this configuration, the projecting portion 10a is properly held between the support 20 and the lift stopper 22. As a result, the package tray 10 is less likely to come off.

In FIG. 5, an angle D is defined by lines L1 and L2. The line L1 is a straight line connecting the center X and the contact point 22a located at the upper end portion of the lift stopper 22. The line L2 is a straight line connecting the center X and the upper end 24d of the declined curved surface 24c. The angle D defines a distance between a first contact point at which the projecting portion 10a is in contact with the lift stopper 22 and a second contact point at which the projecting portion 10a is in contact with the declined curved surface 24c. As the angle D decreases, the distance between the first contact point and the second contact point decreases. Namely, the smaller the angle D, the shorter the distance between the first contact point and the second contact point. Furthermore, as the distance between the first contact point and the second contact point decreases, the projecting portion 10a is more properly held.

Figure 6:
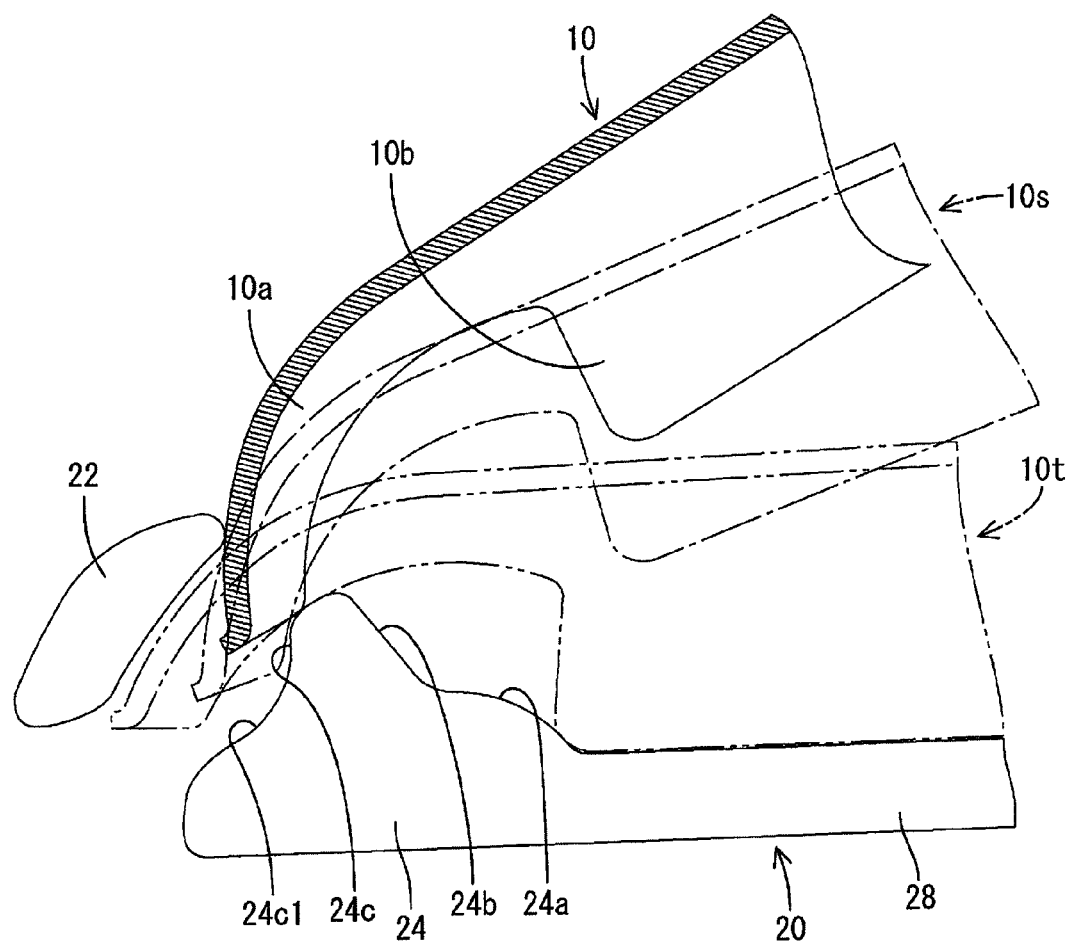
FIG. 6 is a side view of the front-end portion of the package tray assembly illustrating how the package tray is mounted.

Next, how the package tray 10 is attached to the supports 20 and the lift stoppers 22 will be explained. In FIG. 6, dashed-dotted lines illustrate the package tray 10 in an attachment process. A position in the attachment process is indicated by symbol 10s. Dash-double-dotted lines in FIG. 6 illustrate the package tray 10 after the attachment process is completed. A package tray position after the attachment process is completed corresponds to the horizontal position. The horizontal position is indicated by symbol 10t. In the attachment process of the package tray 10 to the supports 20 and the lift stoppers 22, the tips of the projecting portions 10a of the package tray 10 are inserted between the respective guide portions 24 and the respective lift stoppers 22 as illustrated with solid lines in FIG. 6. Next, the tips of the projecting portions 10a are further inserted until they reach the respective recesses 24c. Then, the rear part of the package tray 10 in the position 10s is pulled down and the package tray 10 is slightly pushed forward. As a result the package tray 10 is set in the horizontal position 10t. Through this attachment process, the package tray 10 is easily attached to the supports 20 and the lift stoppers 22.

Figure 7:
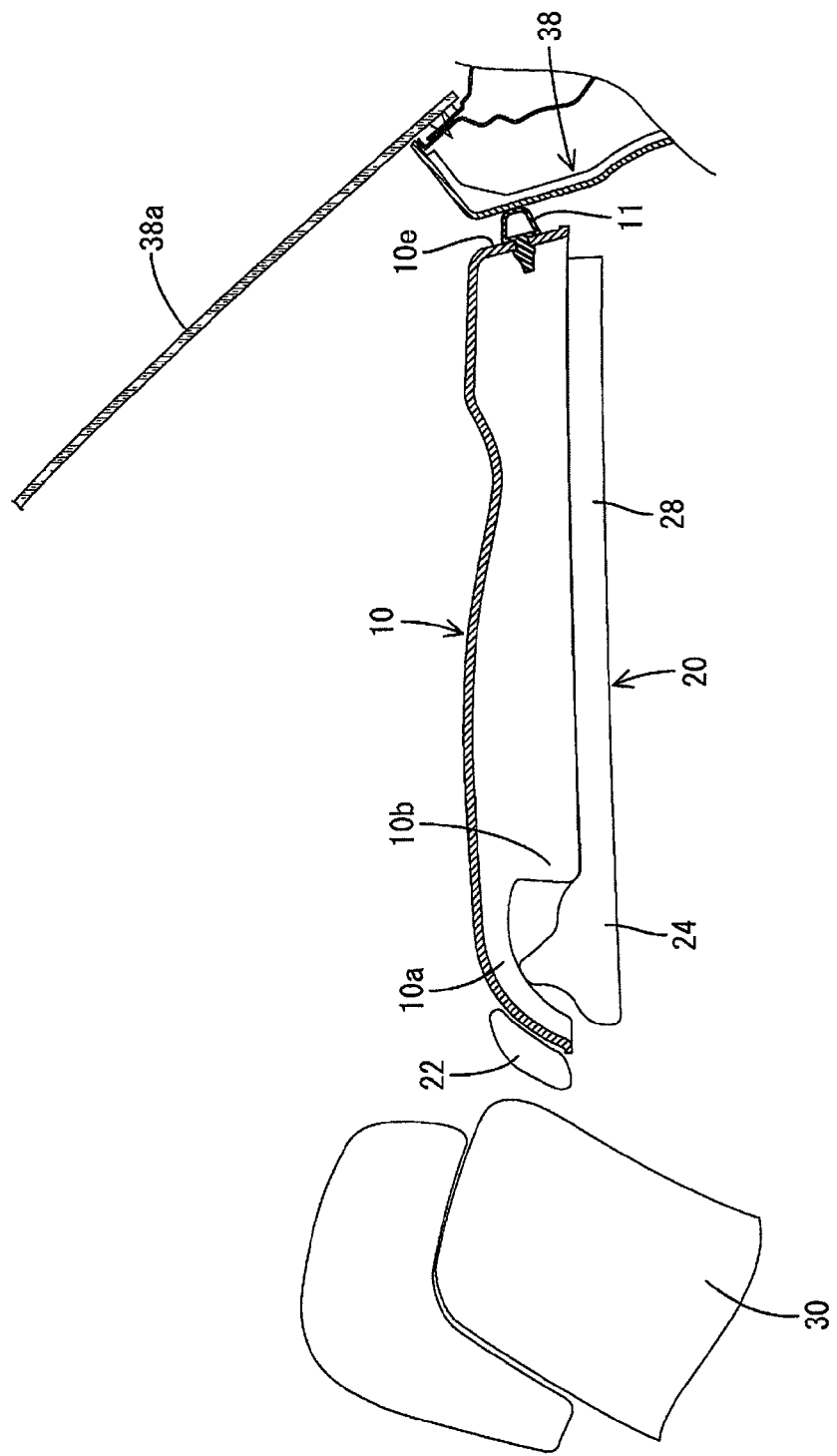
FIG. 7 is a side view of the entire package tray assembly with the package tray set in the horizontal position.

Next, a configuration of a rear wall 10e of the package tray 10 and positional relationships between the package tray 10 and a window 38a of the backdoor 38 when the package tray 10 is opened or closed. As illustrated in FIG. 7, a rubber cushion 11 is provided on the package tray 10. The rubber cushion 11 projects toward the backdoor 38 when the package tray 10 is in the horizontal position. The rubber cushion 11 is an elastic body arranged such that a tip thereof is in contact with the backdoor 38 when backdoor 38 is closed and the package tray 10 is set in the horizontal position. When the package tray 10 is set in the horizontal position, it is pushed forward by the backdoor 38 via the rubber cushion 11.

Figure 8:
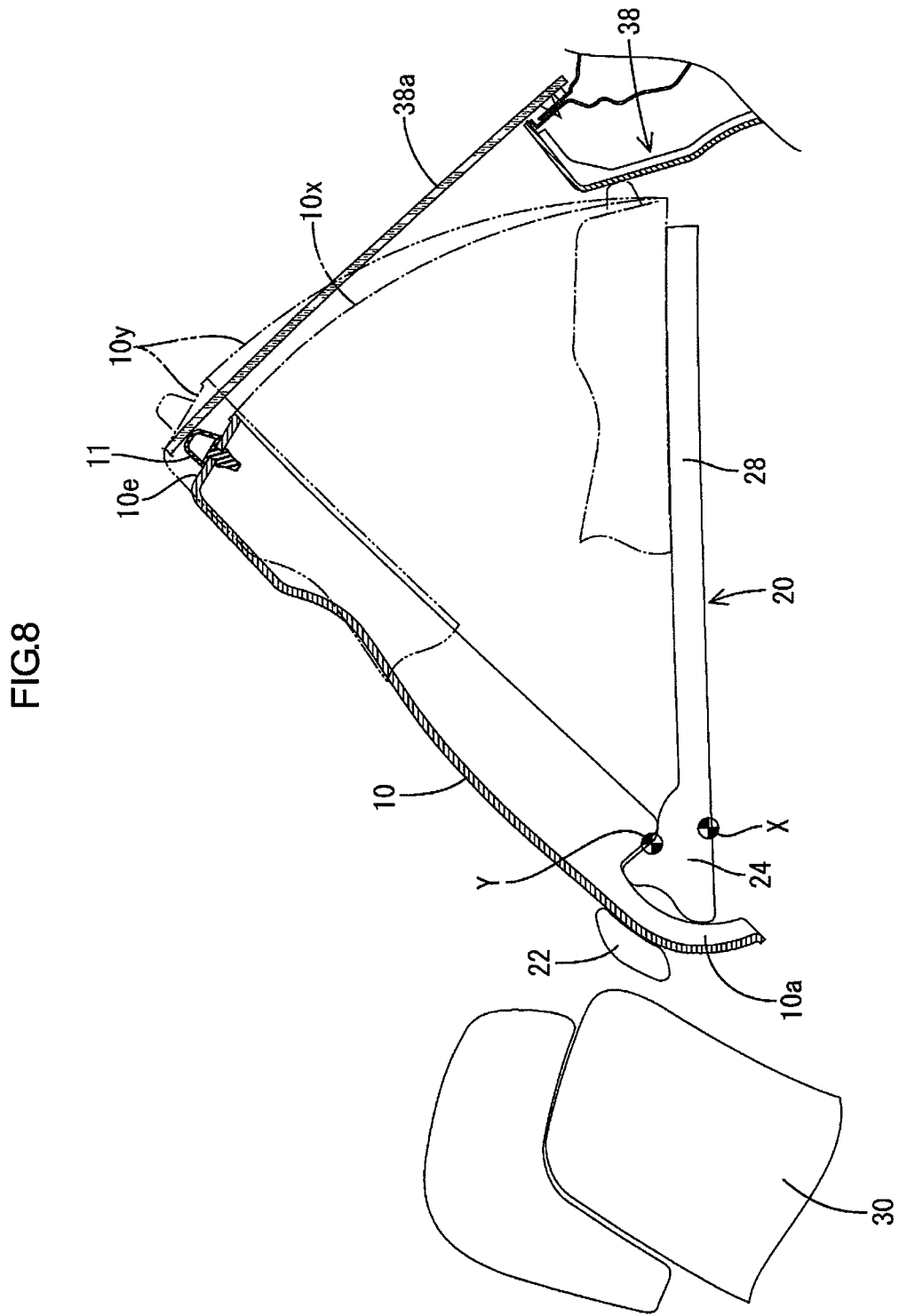
FIG. 8 is a side view of the entire package tray assembly with the package tray set in a forward tilted position.

The package tray 10 in the forward tilted position is illustrated in FIG. 8. Dash-dotted lines 10x in FIG. 8 illustrate an orbit of the rear end of the package tray 10 moving from the horizontal position to the forward tilted position. Dash-double-dotted lines 10y in FIG. 8 illustrate an imaginary orbit of the rear end of the package tray 10 in imaginary movement thereof around a second center Y from the horizontal position to the forward tilted position. The second center Y is located on the guide portion 24. As illustrated in FIG. 8, if the center of rotation is located on the guide portion 24 rather than immediately below the guide portion 24, that is, the second center Y is the center of the rotation, the contact portion of the package tray 10 does not move forward during the rotation. Therefore, the package tray 10 does not move forward when moving from the horizontal position to the forward tilted position. The rear end of the package tray 10 moves as illustrated by the dash-double-dotted lines 10y and thus it is pressed against the window 38a of the backdoor 38. In this embodiment, the center of the rotation of the package tray 10 is the first center X located immediately below the guide portion 24. Therefore, the package tray 10 moves toward the lower front as illustrated by the dash-dotted lines 10x in FIG. 8 when it rotates from the horizontal position to the forward tilted position. As a result, the package tray 10 is not pressed against the window 38a of the backdoor 38.

According to the package tray assembly 1, the package tray 10 rotates around the center X without being supported at the center X. When the package tray 10 rotates from the horizontal position to the forward tilted position, the contact portion 10c thereof moves forward on the convex top surface 24a. Therefore, the package tray 10 moves toward the lower front of the vehicle as it rotates. Even if the package tray 10 does not return to the proper position and remains tilted upward when the backdoor 38 is closed, the rear part of the package tray 10 is less likely to be pressed against the window 38a. This is because the package tray 10 is moved to a position further toward the lower front than the horizontal position. Therefore, an excessive load is less likely to be applied to the package tray 10 when the backdoor 38 is closed.

The package tray of the known art is fixed at the center of rotation so as to be rotatable. According to the package tray assembly 1, the package tray 10 is not fixed at the center X. Furthermore, the center X is set immediately below the guide portion 24. Therefore, the package tray 10 moves toward the lower front when it rotates from the horizontal position to the forward tilted position.

According to the package tray assembly 1, the projecting portion 10a of the package tray 10 that is set in the horizontal position is pushed toward the lower rear by the lift stopper 22. Moreover, the rubber cushion 11 is pushed toward the front by the backdoor 38. Namely, the package tray 10 is pushed from the front and the rear when it is set in the horizontal position. Therefore, the package tray 10 is less likely to rattle due to vibrations of the moving vehicle.

According to the package tray assembly 1, the package tray 10 does not require a shaft and bearings. Therefore, the manufacturing cost can be reduced in comparison to a package tray that requires a shaft and bearings.

According to the package tray assembly 1, the package tray 10 moves toward the lower front when it rotates from the horizontal position to the forward tilted position. Even if the window 38a is largely tilted forward, the package tray 10 is less likely to be pressed against the window 38a when the backdoor 38 is closed.

According to the package tray assembly 1, the projecting portion 10a is sandwiched between the declined curved surface 24c and the lift stopper 22 with a force applied thereto in the thickness direction thereof. Therefore, the projecting portion 10a is less likely to move in a direction other than the rotating direction when the package tray 10 rotates. Therefore, the package tray 10 is less likely to rattle during the rotation.

The guide portion 24 has the recess 24c1 in the declined curved surface 24c. When the projecting portion 10a is inserted between the guide portion 24 and the lift stopper 22 in the attachment process of the package tray 10, the tip of the projecting portion 10a can be temporarily set in the recess 24c1. With this configuration, the projecting portion 10a can be easily inserted between the guide portion 24 and the lift stopper 22.

Second Embodiment

Figure 9:
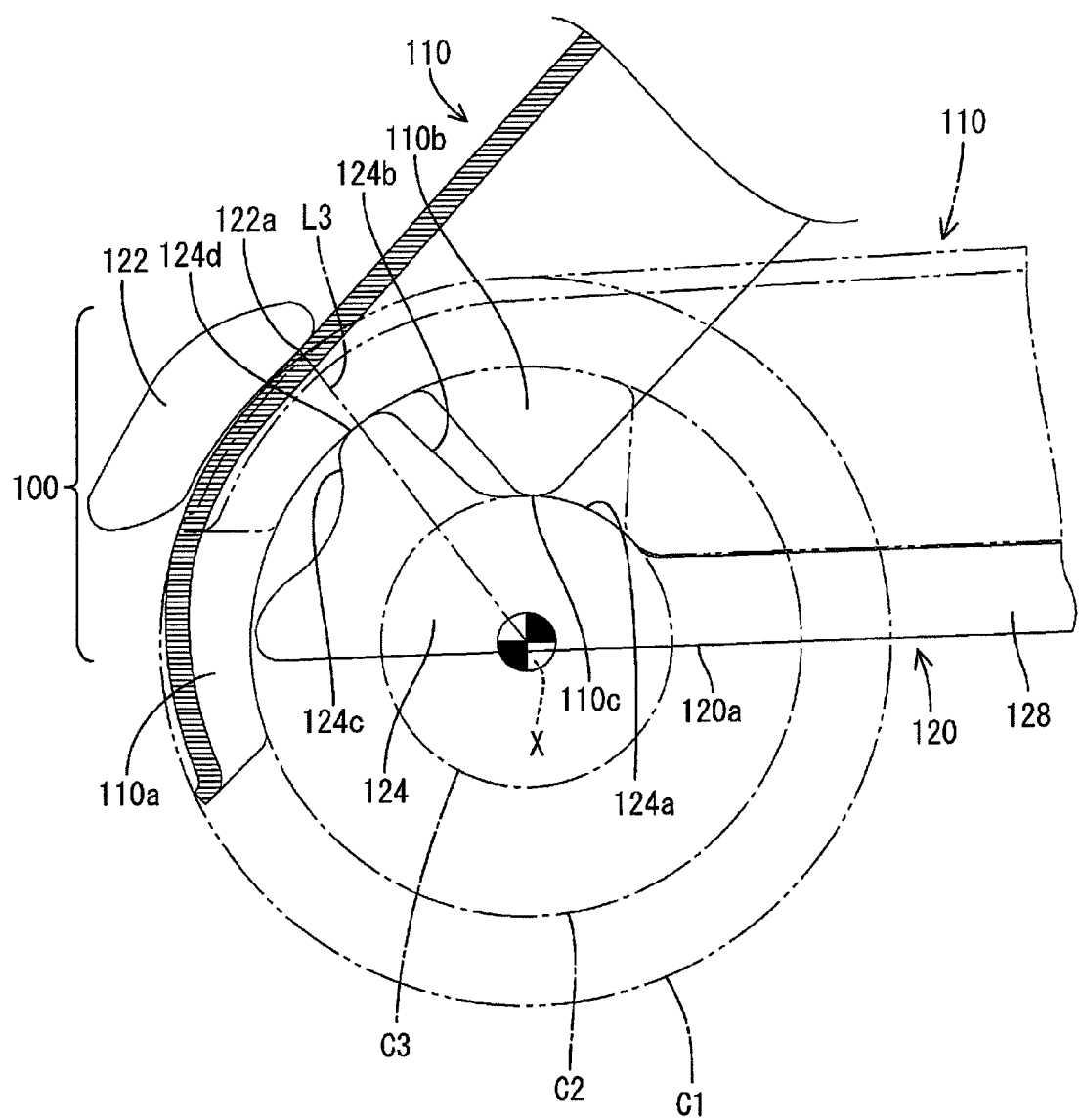
FIG. 9 is a side view of a front-end portion of a package tray assembly according to a second embodiment illustrating how the package tray rotates.

The second embodiment will be explained with reference to FIG. 9. As illustrated in FIG. 9, a package tray assembly 100 includes a package tray 110, a support 120 and a lift stopper 122. The support 120 has a guide portion 124, an inclined surface 124b of which is different from the inclined surface 24b in the first embodiment. Furthermore, the lift stopper 122 is arranged differently from the lift stopper 22 in the first embodiment. Other configurations are the same as the first embodiment. The same structures, functions, and effects are indicated by symbols with the same lower two digits as those in FIG. 5, and will not be explained.

The package tray assembly 100 is configured such that the center X, the upper end 124d of the declined curved surface 124, and a contact point 122a located at the upper end portion of the lift stopper 122 are on line L3. Namely, the angle D defined by line L1 and line L2 in the support structure for the package tray 10 in the first embodiment is set to 0° in this embodiment.

According to package tray assembly 100 of this embodiment, a projecting portion 110a of the package tray 110 is sandwiched between the rear end of the declined curved surface 124c and the lift stopper 122 during rotation of the package tray 110. The rear end of the declined curved surface 124c is located on the rear side of the vehicle. The projecting portion 110a is held by a force applied thereto in a direction perpendicular to the direction in which the projecting portion 110a projects. Namely, the projecting portion 110a is held by the support 120 and the lift stopper 122 such that a distance between a first contact point and a second contact point is the shortest. The first contact point is a contact point between the projecting portion 110a and the declined curved surface 124c. The second contact point is a contact point between the projecting portion 110a and the lift stopper 122. With this configuration, a movement of the projecting portion 110a in a direction other than the rotating direction is restricted. Therefore, the package tray 110 is less likely to rattle during the rotation.

Modifications of the first embodiment and the second embodiment will be explained below.

(1) The center of rotation may be set at any locations immediately below the guide portion.

(2) The declined curved surface may not have the recess. The declined curved surface may be curved outward rather than inward.

(3) The support and the lift stopper may be arranged differently.

(4) The package tray may be formed in a different shape.

The embodiments of the present invention have been described, however, the present invention is not limited to the above embodiments explained in the above description and the drawings. The technology described herein includes various modifications of the above embodiments.

Elements of technology described in this specification or illustrated in the drawings exert technical utility by each or a combination thereof. The elements of technology should not be limited to the combinations of the elements claimed in the original patent application. The technology described in this specification or illustrated in the drawings is provided for achieving multiple objectives at the same time. The technical utility of the technology is exerted when at least one of the objectives is achieved.

The invention claimed is:

1. A package tray assembly for a trunk of a vehicle comprising:
    a support to be mounted to a body of the vehicle, the support including a shelf portion and a guide portion, the shelf portion extending along the body of the vehicle in a front-rear direction of the vehicle, the guide portion having a convex top surface which gradually inclines from the shelf portion toward an upper front of the vehicle and curves upward when mounted to the body of the vehicle; and
    a package tray comprising a contact portion positioned on the convex top surface, the package tray supported by the shelf portion of the support from below and configured to move in the front-rear direction of the vehicle while the contact portion slides on the convex top surface when the package tray is lifted, such that an angle between a top surface of the package tray and the shelf portion of the support changes as the package tray is lifted further.

2. The package tray assembly according to claim 1, further comprising a lift stopper to be mounted to the body of the vehicle away from the guide portion of the support and having an upper end portion, the lift stopper being configured to restrict the front end portion of the package tray from lifting, wherein:
    the guide portion further includes an inclined surface rising from a front end of the convex top surface toward an upper front of the vehicle and a declined curved surface declining from an upper end of the inclined surface toward a lower front of the vehicle;
    the package tray further includes a front end portion and a projecting portion projecting forward from an upper front end of the front end portion and curving downward, the projecting portion being supported by a vertex of the guide portion between the inclined surface and the declined surface so as to be held between the declined curved surface and the lift stopper, the projecting portion configured to rotate around a point located immediately below the guide portion of the support when the package tray is lifted;

the contact portion of the guide portion is located at a lower front end of the front end portion; and the support, the package tray, and the lift stopper are arranged such that the point, vertex, and the upper end portion of the lift stopper are in line when viewed from a side.

3. The package tray assembly according to claim 2, wherein the guide portion has a recess in the declined curved surface.

4. The package tray assembly according to claim 1, further comprising a lift stopper to be mounted to the body of the vehicle away from the guide portion of the support and having a contact portion, the lift stopper being formed in a shape so as to project inward from the body and such that the contact portion is in contact with the package tray when the lift stopper is mounted to the body, and configured to restrict the front end portion of the package tray from lifting, wherein:

the guide portion further includes an inclined surface rising from a front end of the convex top surface toward an upper front of the vehicle and a declined curved surface declining from an upper end of the inclined surface toward a lower front of the vehicle;

the package tray further includes a front end portion and a projecting portion projecting from an upper front end of the front end portion and curving downward, the projecting portion being supported by a vertex of the guide portion between the inclined surface and the declined curved surface so as to be held between the declined curved surface and the lift stopper while being in contact with the contact portion of the lift stopper, the projecting portion being configured to rotate around a point located immediately below the guide portion of the support when the package tray is lifted; and the support, the package tray, and the lift stopper are arranged such that the point, the upper end of the declined curved surface, and the contact portion of the lift stopper are in line when viewed from a side.

5. The package tray assembly according to claim 2, wherein the package tray includes a front end surface configured to be in contact with the inclined surface of the guide portion when the contact portion is at the front end of the convex top surface such that inclined surface restricts further forward movement of the contact portion.

6. The package tray assembly according to claim 5, wherein the projecting portion has a thickness smaller than a height of the front end portion and projects from an upper part of the front end surface, the height of the front end portion being measured in a vertical direction of the vehicle when the package tray is properly mounted to the vehicle to cover the trunk.

7. The package tray assembly according to claim 6, wherein a thickness of the projecting portion is generally constant along an entire part thereof.

8. The package tray assembly according to claim 6, wherein the lift stopper is arranged such that a distance between a rear end of the lift stopper and a rear end of the declined curved surface of the guide portion is larger than a thickness of the projecting portion and smaller than the height of the front end portion.

9. The package tray assembly according to claim 5, wherein the front end portion has a bottom surface that is generally perpendicular to the front end surface, and the contact portion is located at a corner between the front end surface and the bottom surface.

10. The package tray assembly according to claim 1, wherein the front end portion has a corner at a lower front part thereof, and the contact portion is located at the corner.

11. The package tray assembly according to claim 10, wherein the contact portion has a dimension measuring in a direction perpendicular to a front-rear direction in which the contact portion moves and is in line contact with the convex top surface.

\* \* \* \* \*